United States Patent
Morioka et al.

(10) Patent No.: US 10,952,095 B2
(45) Date of Patent: Mar. 16, 2021

(54) COMMUNICATION DEVICE, COMMUNICATION METHOD, AND PROGRAM

(71) Applicant: Sony Corporation, Tokyo (JP)

(72) Inventors: Yuichi Morioka, Kanagawa (JP); Kosuke Aio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 16/339,723

(22) PCT Filed: Sep. 13, 2017

(86) PCT No.: PCT/JP2017/032953
§ 371 (c)(1),
(2) Date: Apr. 5, 2019

(87) PCT Pub. No.: WO2018/105191
PCT Pub. Date: Jun. 14, 2018

(65) Prior Publication Data
US 2019/0313282 A1    Oct. 10, 2019

(30) Foreign Application Priority Data

Dec. 7, 2016    (JP) .............................. JP2016-237199

(51) Int. Cl.
*G01R 31/08*    (2020.01)
*G06F 11/00*    (2006.01)
(Continued)

(52) U.S. Cl.
CPC .......... *H04W 28/06* (2013.01); *H04W 52/24* (2013.01); *H04W 52/245* (2013.01); *H04W 74/08* (2013.01); *H04W 84/12* (2013.01)

(58) Field of Classification Search
CPC ... H04W 28/06; H04W 52/24; H04W 52/245; H04W 74/08; H04W 84/12; H04W 48/08;
(Continued)

(56) References Cited

U.S. PATENT DOCUMENTS 5,603,096 A * 2/1997 Gilhousen ........... H04W 52/267
370/468
10,375,683 B2 * 8/2019 Verma ................. H04W 52/146
(Continued)

FOREIGN PATENT DOCUMENTS

| JP | 2010-283799 A | 12/2010 |
| JP | 2016-519548 A | 6/2016 |

(Continued)

OTHER PUBLICATIONS

Translation of Son et al., WO-2016028032A1, pp. 1-48, filed Aug. 13, 2015.*

(Continued)

*Primary Examiner* — Stephen M D Agosta
(74) *Attorney, Agent, or Firm* — Xsensus LLP

(57) ABSTRACT

[Object] To reduce the frequency of the occurrence of the transmission collision of frames.
[Solution] A communication device, including: a receiving unit configured to receive a frame transmitted by another terminal; a length information acquiring unit configured to acquire length information related to the frame from the received frame; and a transmission frame deciding unit configured to decide a length of a transmission frame on the basis of the acquired length information.

11 Claims, 13 Drawing Sheets

(51) Int. Cl.

| | | |
|---|---|---|
| *G08C 15/00* | (2006.01) | |
| *H04J 1/16* | (2006.01) | |
| *H04L 1/00* | (2006.01) | |
| *H04L 12/26* | (2006.01) | |
| *H04W 28/06* | (2009.01) | |
| *H04W 52/24* | (2009.01) | |
| *H04W 74/08* | (2009.01) | |
| *H04W 84/12* | (2009.01) | |

(58) Field of Classification Search
CPC ......... H04W 72/1263; H04W 74/0816; H04W 24/02; H04L 5/0007; H04L 27/0006; H04L 27/2602; H04L 5/0037; H04L 5/0044; H04L 5/0073; H04L 5/0091; H04L 37/086; H04L 37/0617; H04L 37/0697; H04L 310/27; H04L 310/272; H04J 13/0044; H04J 13/0048; H04J 2203/005; H04J 3/0608; H04J 3/076; H04J 3/1605; H04M 11/00; H04M 11/007; H04M 11/06
See application file for complete search history.

(56) References Cited

U.S. PATENT DOCUMENTS

| | | | | |
|---|---|---|---|---|
| 10,405,324 | B2* | 9/2019 | Zhong | ..................... H04L 43/16 |
| 10,412,617 | B2* | 9/2019 | Pandey | ............. H04W 28/0252 |
| 10,499,336 | B2* | 12/2019 | Lin | ......................... H04W 8/14 |
| 2006/0168343 | A1* | 7/2006 | Ma | ........................ H04W 52/38 |
| | | | | 709/245 |
| 2011/0003611 | A1* | 1/2011 | Haas | ................... H04W 52/146 |
| | | | | 455/512 |
| 2012/0044900 | A1* | 2/2012 | Morioka | .............. H04B 7/0851 |
| | | | | 370/329 |
| 2012/0140662 | A1* | 6/2012 | Jeong | .................... H04L 1/0007 |
| | | | | 370/252 |
| 2016/0227441 | A1 | 8/2016 | Park et al. | |
| 2017/0257817 | A1 | 9/2017 | Itagaki et al. | |

FOREIGN PATENT DOCUMENTS

| | | |
|---|---|---|
| WO | 2016028032 A1 | 2/2016 |
| WO | 2016/136116 A1 | 9/2016 |

OTHER PUBLICATIONS

IEEE, "Wireless LAN Medium Access Control (MAC) and Physical Layer (PHY) Specifications", Amendment 4: Enhancements for Very High Throughput for Operation in Bands below 6 GHz, Dec. 11, 2013, 425 pages.
International Search Report dated Dec. 5, 2017 for PCT/JP2017/032953 filed on Sep. 13, 2017, 18 pages including English Translation.
Extended European Search Report dated Oct. 15, 2019, issued in corresponding European Application No. 17877610.0, 9 pages.
James Wang, Comment Resolution on OBSS_PD Conditions in 25.9.3, IEEE 802.11-16/0957r1, Jul. 24, 2016, 3 pages.

* cited by examiner

COMMUNICATION DEVICE, COMMUNICATION METHOD, AND PROGRAM

CROSS-REFERENCE TO RELATED APPLICATIONS

The present application is based on PCT filing PCT/JP2017/032953, filed Sep. 13, 2017 which claims priority to JP 2016-237199 filed Dec. 7, 2016, the entire contents of each are incorporated herein by reference.

TECHNICAL FIELD

The present disclosure relates to a communication device, a communication method, and a program.

BACKGROUND ART

In recent years, a wireless local area network (LAN) represented by Institute of Electrical and Electronics Engineers (IEEE) 802.11 disclosed in Non-Patent Literature 1 has been spreading. Further, along with this, wireless LAN compatible products (hereinafter also referred to as a wireless communication devices) have also been increasing. As the number of wireless communication devices increases, a probability of the occurrence of collisions increases when the wireless communication device transmits frames (packets), and the communication efficiency is lowered due to the transmission collision.

CITATION LIST

Non-Patent Literature

Non-Patent Literature 1: IEEE Standard for Information technology-Telecommunications and information exchange between systems Local and metropolitan area networks-Specific requirements-Part 11: Wireless LAN Medium Access Control (MAC) and Physical Layer (PHY) specifications, IEEE Std 802.11ac, IEEE, 2013

DISCLOSURE OF INVENTION

Technical Problem

In the IEEE 802.11 standard disclosed in Non-Patent Literature 1, various techniques have been adopted in order to avoid the transmission collision described above. For example, a carrier sense technique that detects transmission of another wireless communication device before a wireless communication device starts transmitting frames has been adopted.

However, even in the technique adopted in the IEEE 802.11 standard disclosed in Non-Patent Literature 1, there is a situation that it is difficult to prevent the transmission collision of frames. In this regard, the present disclosure proposes a communication device, a communication method, and a program which are capable of reducing the frequency of the occurrence of the transmission collision of frames.

Solution to Problem

According to the present disclosure, there is provided a communication device, including: a receiving unit configured to receive a frame transmitted by another terminal; a length information acquiring unit configured to acquire length information related to the frame from the received frame; and a transmission frame deciding unit configured to decide a length of a transmission frame on the basis of the acquired length information.

In addition, according to the present disclosure, there is provided a communication method, including: receiving, by a processor, a frame transmitted by another terminal; acquiring, by the processor, length information related to the frame from the received frame; and deciding, by the processor, a length of a transmission frame on the basis of the acquired length information.

In addition, according to the present disclosure, there is provided a program causing a processor to: receive a frame transmitted by another terminal; acquire length information related to the frame from the received frame; and decide a length of a transmission frame on the basis of the acquired length information.

Advantageous Effects of Invention

As described above, according to the present disclosure, the frequency of the occurrence of the transmission collision of frames is reduced.

Note that the effects described above are not necessarily limitative. With or in the place of the above effects, there may be achieved any one of the effects described in this specification or other effects that may be grasped from this specification.

MODE(s) FOR CARRYING OUT THE INVENTION

Figure 1:
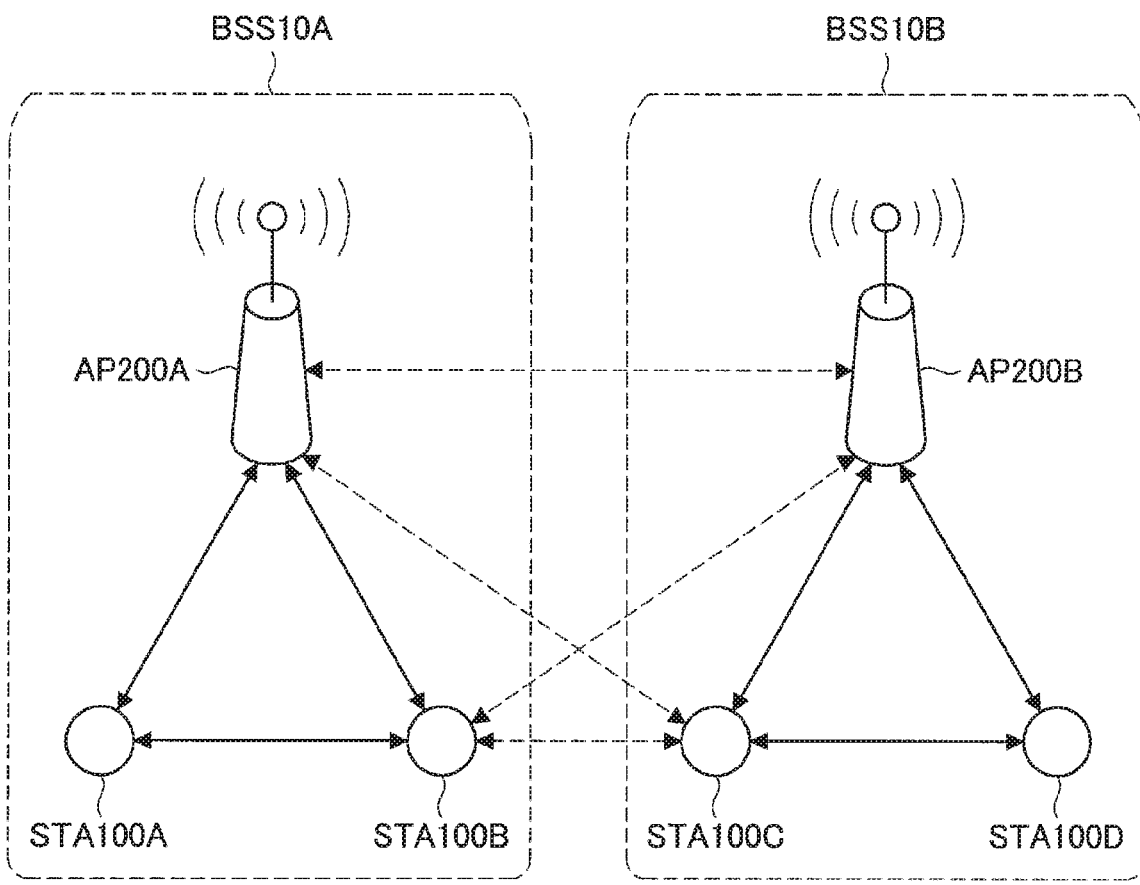
FIG. 1 is a diagram schematically illustrating a wireless system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Overview of wireless LAN system
2. Configuration of station device
3. Operation of device
4. Modifications
5. Application examples
6. Supplemental remarks
7. Conclusion

1. Overview of Wireless LAN System

An embodiment of the present disclosure relates to a wireless LAN system. First, a description will be given of an overview of a wireless LAN system according to an embodiment of the present disclosure.

1-1. Configuration of Wireless LAN System

FIG. 1 illustrates a configuration of a wireless LAN system according to an embodiment of the present disclosure. As illustrated in FIG. 1, the wireless LAN system according to an embodiment of the present disclosure includes access point devices (hereinafter referred to as "access point (AP)" for convenience) 200 and station devices (hereinafter referred to as "station (STA)" for convenience) 100. Then, one AP 200 and one or more STAs 100 constitute a basic service set (hereinafter referred to as "basic service set (BSS)" for convenience) 10.

Note that the STA 100 according to the present embodiment is a communication device that communicates with the AP 200, and that the STA 100 may be any communication device. For example, the STA 100 may be a display with a display function, a memory with a storage function, a keyboard and a mouse with an input function, a speaker with a sound output function, or a smartphone with a function of executing advanced calculation processing.

Note that the wireless LAN system according to an embodiment of the present disclosure may be installed in any place. For example, the wireless LAN system according to the present embodiment may be installed in office buildings, housing, commercial facilities, public facilities, or the like.

Further, there are cases in which an area of the BSS 10 according to the present embodiment overlaps areas of other BSSs 10 (hereinafter referred to as an "Overlap Basic Service Set (OBSS)" for convenience) in which a radio wave from the AP 200 reaches overlap.

If the description proceeds with the example of FIG. 1, the area of the BSS 10A overlaps with a part of the area of the BSS 10B which is the OBSS, and the STA 100B and the STA 100C are located in the overlapping area. In this case, a signal transmitted from the STA 100B belonging to the BSS 10A is observed in the AP 200 B and the STA 100C belonging to the BSS 10B. At this time, the STA 100B and the STA 100C belonging to the different BSS 10 perform several determinations on the basis of information included in a frame transmitted from the other terminal and reception power of the frame.

Figure 2:
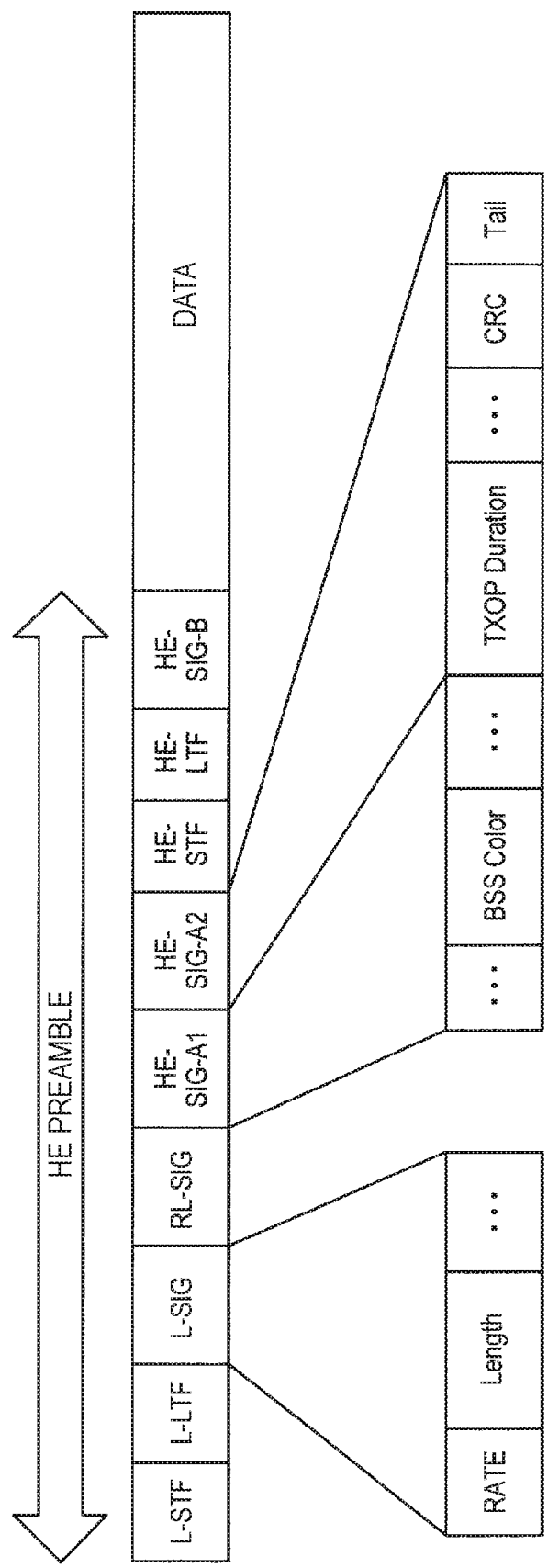
FIG. 2 is a diagram illustrating an example of a frame format transmitted by a station device according to an embodiment of the present disclosure.

FIG. 2 is a diagram illustrating an example of a frame format of frames transmitted by the STA 100 and the AP 200. Portions related to the present embodiment in the frame format illustrated in FIG. 2 are described. L-SIG, HE-SIG-A1, and HE-SIGA2 are included in a HE-preamble (hereinafter also referred to as a "header" for convenience) of the frame format illustrated in FIG. 2.

Further, L-SIG includes RATE and Length. Here, RATE is information indicating a data rate, and Length is information indicating a frame length of a frame. With these two pieces of information, a transmission time of a frame is determined. In other words, it is possible to acquire the transmission time of the frame by dividing Length by RATE (Length/RATE).

Further, HE-SIG-A1 includes BSS Color, and HE-SIG-A2 includes TXOP Duration. The BSS Color is identification information used for determining the BSS 10, and the STA 100 determine the BSS 10 to which the STA 100 which has transmitted a received frame belongs using BSS Color. In other words, the STA 100 can determine whether or not the received frame is transmitted from the STA 100 belonging to the OBSS using the BSS Color. Further, in the following description, a signal received from the STA 100 belonging to the OBSS is referred to as an "OBSS signal" for convenience.

TXOP Duration included in HE-SIG-A2 is information indicating a channel use period, and the STA 100 can acquire length information of a frame even on the basis of this information.

Figure 3:
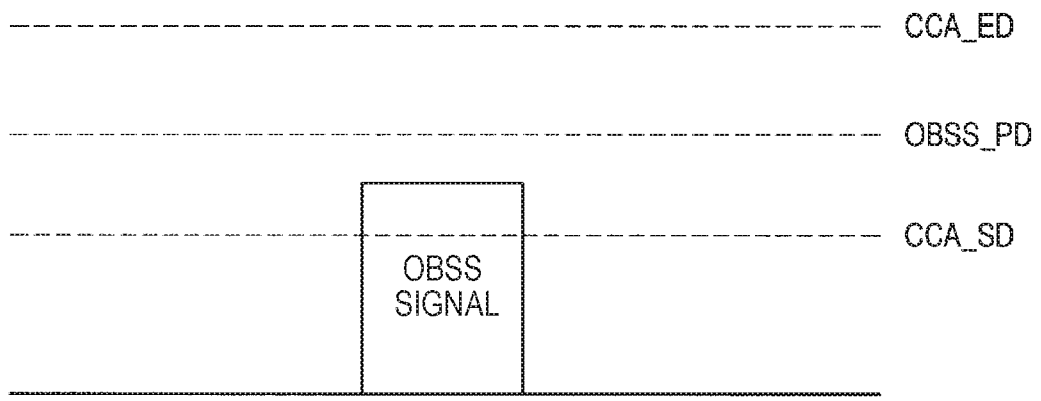
FIG. 3 is a diagram illustrating an example of a detection threshold value of each signal in an embodiment of the present disclosure.

FIG. 3 is a diagram illustrating an example of a relation between reception power of the received OBSS signal and detection threshold values of several signals. CCA_SD is a value used for detecting a preamble of a frame, and CCA_ED is a value used for an energy value of a received radio wave. As au example, CCA_SD may be −82 dBm, and CCA_ED may be −62 dBm. Further, OBSS_PD is a threshold value used for reception power of the OBSS signal, and a method of using OBSS_PD will be described later. Further, OBSS_PD is set to a value between CCA_SD and CCA_ED as illustrated in FIG. 3. A setting value of OBSS_PD is, for example, −72 dBm. However, the setting value of OBSS_PD is not limited to this example.

The STA 100 complying to the IEEE 802.11 standard executes the carrier sense before transmitting a frame and is used to determine whether a medium is in the idle state or busy state. In other words, when the carrier sense is performed, in a case in which a preamble with reception power of CCA_SD or higher is received, the STA 100 determines that the medium is generally busy. Further, in a case in which a radio wave with reception power of CCA_ED or higher is received, STA 100 does not perform the frame transmission.

1-2. Background of the Present Disclosure

In the wireless LAN system having the above configuration, spatial reuse in which the STA 100 may transmit a frame in a case in which the influence of the OBSS signal from the STA 100 belonging to the OBSS is small is under review.

Figure 4:
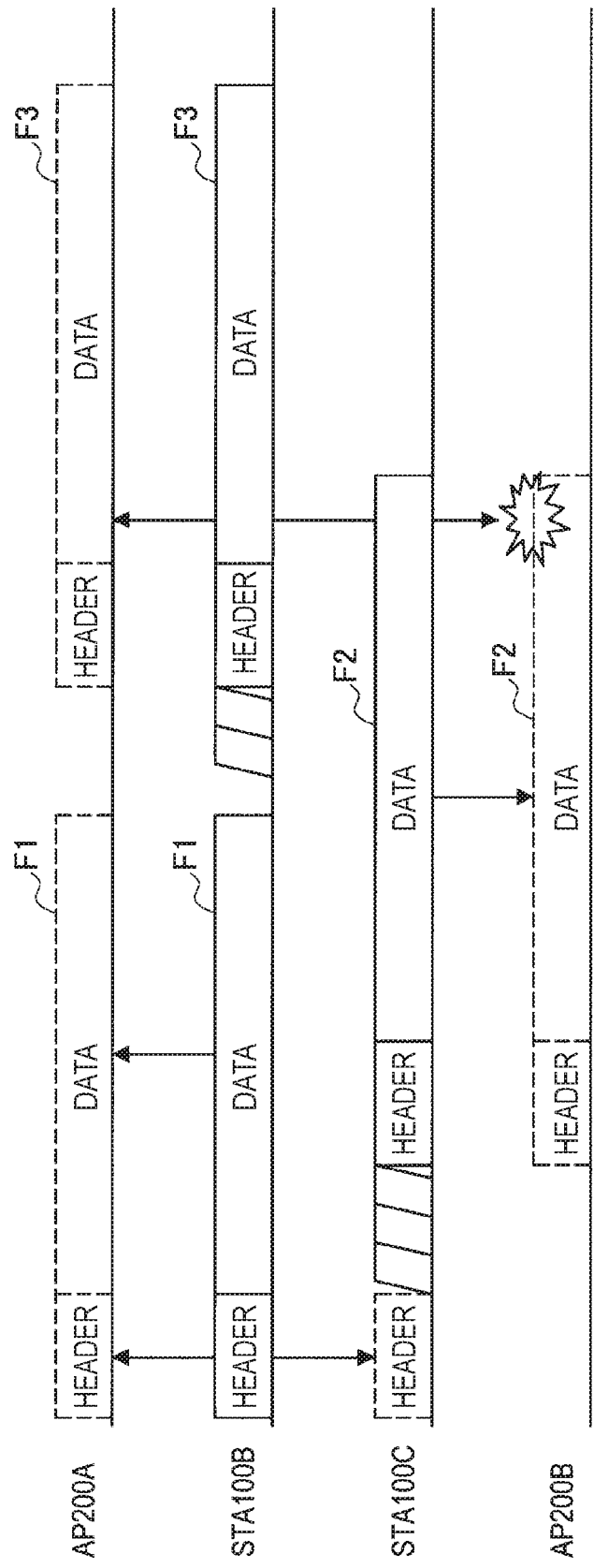
FIG. 4 is a diagram schematically illustrating the occurrence of collision of transmission frames according to an embodiment of the present disclosure.

FIG. 4 is a diagram illustrating an operation example of the STA 100 and the AP 200 in a case in which the spatial reuse is performed. Further, a relation of the AP 200A, the AP 200B, the STA 100B, and the STA 100C illustrated in FIG. 4 is similar to the relation illustrated in FIG. 1. In other words, the AP 200A and the STA 100B belong to the same BSS 10A, and the AP 200B and the STA 100C belong to the BSS 10B.

A case in which the STA 100B first transmits a frame as illustrated in FIG. 4, will be described. If the STA 100B transmits a frame (F1), the AP 200A and the STA 100C receive a header of the frame (F1) transmitted by the STA 100B. Upon detecting the signal, the STA. 100C determines whether or not the received signal is the OBSS signal on the basis of BSS Color included in the received header. Further, the determination of the OBSS signal by the STA 100C may be performed by determining whether or not BSS Color included in the received header is the same BSS Color as the BSS 10B to which the STA 100C belongs.

In a case in which the STA 100C determines that the received signal is the OBSS signal, the STA 100C compares the reception power of the received OBSS signal with OBSS_PD illustrated in FIG. 3. In a case in which the STA 100C determines that the reception power of the received OBSS signal is lower than or equal to OBSS_PD by the comparison, since the OBSS signal is assumed to have small influence on the frame transmission of the STA 100C, the STA 100C determines that the medium is in the idle state.

Then, the STA 100C starts an operation for transmitting a frame (F2) to the AP 200B of the BSS 10B to which the STA 100C belongs. The transmission of the frame (F2) to the AP 200B of the STA 100C is performed in parallel with the transmission of the frame (F1) which is the OBSS signal. As illustrated in FIG. 4, the STA 100C is on standby for a backoff time to avoid a collision between transmission of a frame from another STA 100 belonging to the BSS 10B and transmission of the frame by the STA 100C, and then starts transmitting the frame (F2).

Then, if the transmission of the frame (F1) by the STA 100B is completed, the STA 100B executes the carrier sense for performing transmission of a next frame (F3). The carrier sense by STA 100B is started from the middle of the transmission of the frame (F2) by STA 100C. Therefore, the STA 100B does not determine whether or not the frame transmitted by the STA 100C is an OBSS signal since it is difficult to receive the header of the frame transmitted by the STA 100C. In other words, since the determination of whether or not the received signal is the OBSS signal is performed on the basis of OBSS_Color included in the header, it is difficult for the STA 100B to determine whether or not the frame transmitted by the STA 100C is the OBSS signal.

Further, when the carrier sense is executed after the frame (F1) is transmitted, the STA 100B detects the frame (F2) from the STA 100C using a threshold value of CCA-ED which is a threshold value higher than CCA-SD which is a threshold value for detecting the preamble.

Therefore, in a case in which the OBSS signal from the STA 100C arrives at the STA 100B with the power equal to or lower than CCA-ED, the STA 100B does not detect the frame (F2) by the STA 100C and therefore starts transmitting a new frame (F3).

The transmission of the next frame (F3) by the STA 100B starts before the transmission of the frame (F2) by the STA 100C is completed as illustrated in FIG. 4. Therefore, in the AP 200B, a collision occurs between the transmission of the frame (F3) from the STA 100B and the transmission of the frame (F2) from the STA 100C. Thus, the present embodiment proposes a process for preventing the collision in the AP 200B.

2. Configuration of Station Device

Figure 5:
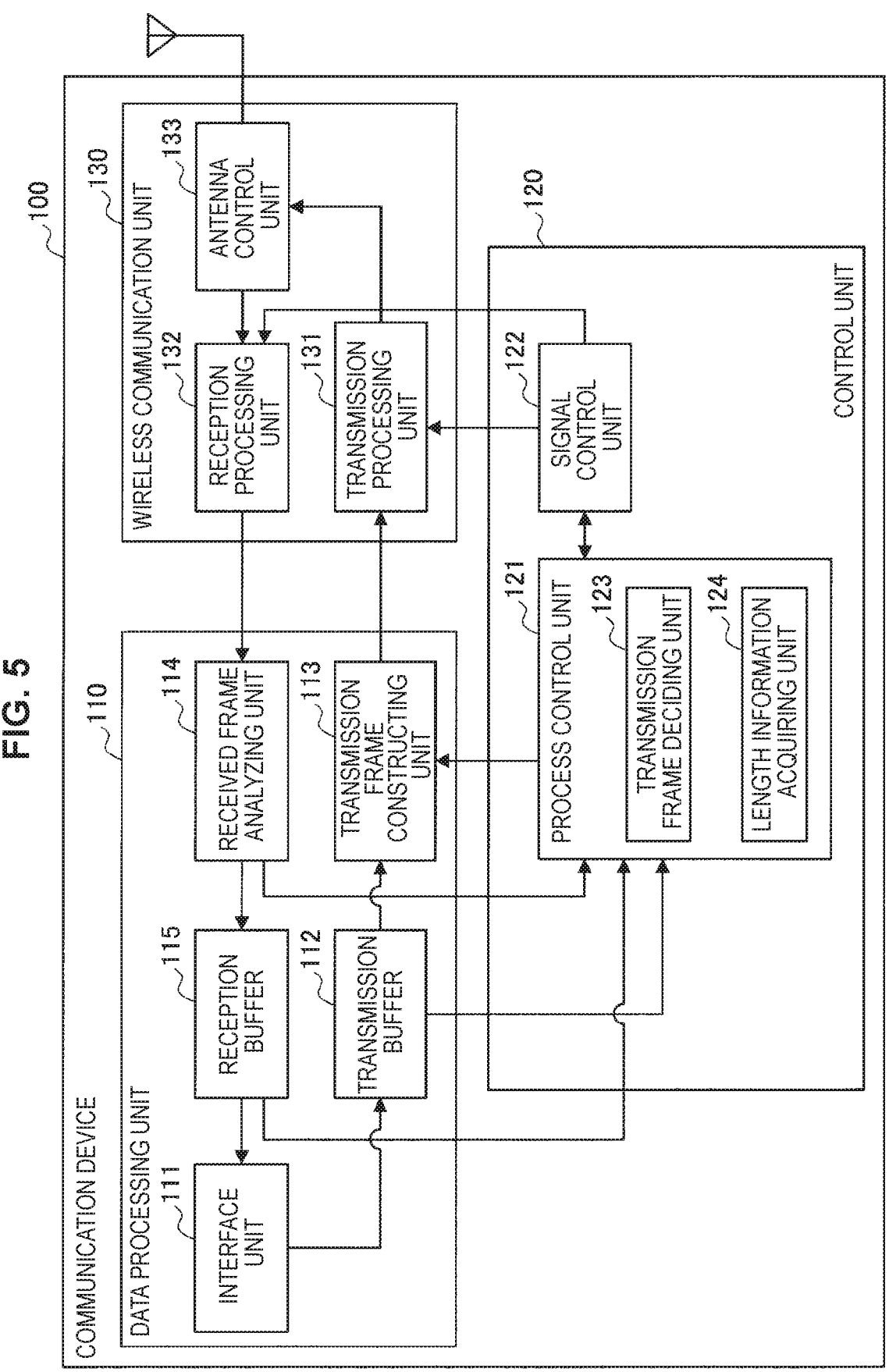
FIG. 5 is a block diagram illustrating an example of a configuration of a station device according to an embodiment of the present disclosure.

The overview of the wireless LAN system of the present disclosure and the background of the present disclosure have been described above. A functional configuration of the station device 100 according to the present embodiment will be described below with reference to FIG. 5. FIG. 5 is a block diagram illustrating an example of a schematic functional configuration of the station device 100 according to the present embodiment.

As illustrated in FIG. 5, the station device 100 includes a data processing unit 110, a control unit 120, and a wireless communication unit 130 as a communication unit.

Data Processing Unit

As illustrated in FIG. 5, the data processing unit 110 includes an interface unit 111, a transmission buffer 112, a transmission frame constructing unit 113, a received frame analyzing unit 114, and a reception buffer 115.

The interface unit 111 is an interface connected to the other functional configurations installed in the station device 100. More specifically, the interface unit 111 performs reception of data which is desired to be transmitted from the other functional configuration, for example, an application, provision of received data to the application, and the like.

The transmission buffer 112 stores data to be transmitted. Specifically, the transmission buffer 112 stores the data obtained by the interface unit 111.

The transmission frame constructing unit 113 generates a frame to be transmitted. Specifically, the transmission frame constructing unit 113 generates a frame on the basis of the data stored in the transmission buffer 112 or control information set by the control unit 120. For example, the transmission frame constructing unit 113 generates a frame from data acquired from the transmission buffer 112, and performs processes such as addition of a MAC header for a media access control (MAC) and addition of an error detection code to the generated frame or the like.

The received frame analyzing unit 114 analyzes the received frame. Specifically, the received frame analyzing unit 114 determines a destination of the frame received by the wireless communication unit 130 and acquires data or control information included in the frame. For example, the received frame analyzing unit 114 acquires data or the like included in the received frame by performing analysis of the MAC header, detection and correction of a code error, a reordering process, and the like on the received frame.

Further, the received frame analyzing unit 114 determines whether or not the received frame is the OBSS signal. Specifically, the received frame analyzing unit 114 determines whether or not the received frame is the OBSS signal on the basis of OBSS_Color included in the received frame. If it is determined that the received frame is the OBSS signal, the received frame analyzing unit 114 does not processes frames subsequent to HE-SIG-A2 in the frame format illustrated in FIG. 2. As described above, the received frame analyzing unit is an example of a signal determining unit. Further, the received frame analyzing unit 114 compares the reception power of the received OBSS signal with each threshold value illustrated in FIG. 3. Further, the received frame analyzing unit 114 transmits a comparison result to a process control unit 121.

The reception buffer 115 stores the received data. Specifically, the reception buffer 115 stores the data acquired by the received frame analyzing unit 114.

Control Unit

As illustrated in FIG. 5, the control unit 120 includes a process control unit 121 and a signal control unit 122. Further, the process control unit 121 includes a transmission frame deciding unit 123 and a length information acquiring unit 124.

The process control unit 121 controls an operation of the data processing unit 110. Specifically, the process control unit 121 controls the occurrence of communication. For example, if a communication connection request occurs, the process control unit 121 causes the data processing unit 110 to generate a frame related to a connection process or an authentication process such as an association process or an authentication process.

Further, the process control unit 121 controls the generation of frames on the basis of a data storage state in the transmission buffer 112, an analysis result for the received frame, or the like. For example, in a case in which data is stored in the transmission buffer 112, the process control unit 121 instructs the transmission frame constructing unit 113 to generate a data frame in which the data is stored. Further, in a case in which reception of the frame is confirmed by the received frame analyzing unit 114, the process control unit 121 instructs the transmission frame constructing unit 113 to generate an acknowledgment frame (ACK) which is a response to the received frame.

On the basis of the RATE information and the Length information or the channel use period (TXOP Duration) included in the preamble of the received frame, the length information acquiring unit 124 in the process control unit 121 acquires a transmission time or length information which is a bit length of the received frame.

The transmission frame deciding unit 123 in the process control unit 121 decides the length of the transmission frame on the basis of the length information of the received frame acquired by the length information acquiring unit 124 as will described later. Further, the transmission frame deciding unit 123 controls a transmission timing of the transmission frame. Further, the transmission frame deciding unit 123 determines whether or not the medium is in the idle state on the basis of information from the received frame analyzing unit 114. For example, the transmission frame deciding unit 123 determines whether or not the medium is in the idle state on the basis of a determination result for the reception power of the OBSS signal received from the received frame analyzing unit 114.

The signal control unit 122 controls an operation of the wireless communication unit 130 on the basis of information from the process control unit 121. Specifically, the signal control unit 122 controls a transmission/reception process of the wireless communication unit 130. For example, the signal control unit 122 causes the wireless communication unit 130 to set parameters for transmission and reception on the basis of an instruction from the process control unit 121.

Figure 6:
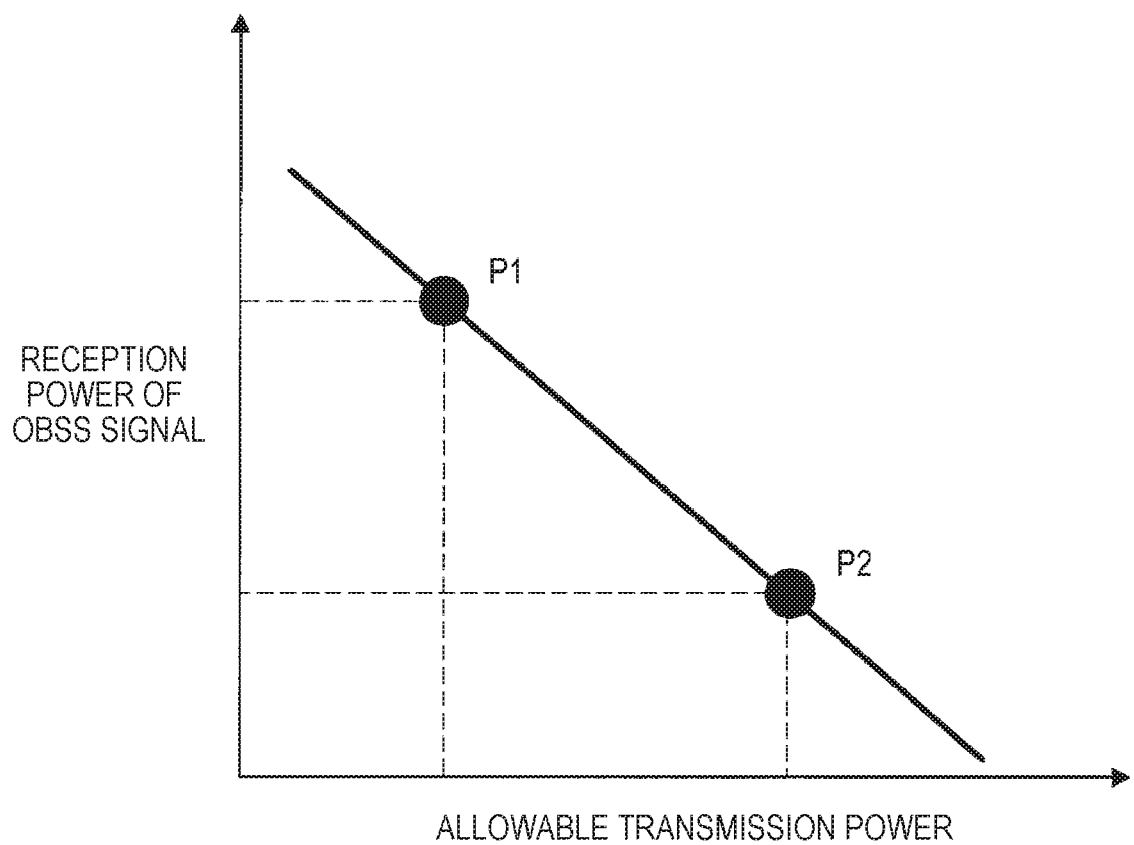
FIG. 6 is a diagram illustrating a relation between reception power of an OBSS signal and allowable transmission power in an embodiment of the present disclosure.

Further, the signal control unit 122 controls the transmission power of the transmission frame. For example, as illustrated in FIG. 6, the signal control unit may control the transmission power of the transmission frame in accordance with the reception power of the OBSS signal. For example, the signal control unit 122 can transmit the frame with power lower than or equal to the threshold value of OBSS-PD. If the reception power of the OBSS signal is high, since it is assumed that the station device 100 that has transmitted the OBSS signal is close, the signal control unit 122 decreases the transmission power of the transmission frame to be lower than predetermined reference transmission power so that the reception of the OBSS signal is not hindered. Further, the signal control unit 122 can transmit the frame without adjusting the transmission power of the transmission frame if the reception power of the OBSS signal is low.

In other words, in a state of P1 illustrated in FIG. 6, since the reception power of the OBSS signal is high, the signal control unit 122 decreases the transmission power and transmits the frame. Further, in a state indicated by P2, since the reception power of the OBSS signal is low, the signal control unit 122 transmits the frame without adjusting the transmission power. As described above, the signal control unit 122 is an example of a transmission power control unit. Further, the information related to the reception power of the OBSS signal may be acquired by the received frame analyzing unit 114.

Wireless Communication Unit

Returning to the description of the configuration of the station device 100 in FIG. 5, the wireless communication unit 130 includes a transmission processing unit 131, a reception processing unit 132, and an antenna control unit 133 as illustrated in FIG. 5.

The transmission processing unit 131 performs a frame transmission process. Specifically, the transmission processing unit 131 generates a signal to be transmitted on the basis of the frame provided from the transmission frame constructing unit 113. More specifically, the transmission processing unit 131 generates a signal related to a frame on the basis of a parameter set in accordance with an instruction from the signal control unit 122. For example, the transmission processing unit 131 generates a symbol stream by performing encoding, interleaving, and modulation on the frame provided from the data processing unit 110 in accordance with a coding and modulation scheme or the like instructed by the control unit 120. Further, the transmission processing unit 131 performs conversion into an analog signal, amplification, filtering, and frequency up-conversion on the signal related to the symbol stream obtained by a process at a preceding stage.

Further, the transmission processing unit 131 may perform a frame multiplexing process. Specifically, the transmission processing unit 131 performs a process related to frequency division multiplexing or space division multiplexing.

The reception processing unit 132 performs a frame reception process. More specifically, the reception processing unit 132 performs frame restoration on the basis of the signal provided from the antenna control unit 133. For example, the reception processing unit 132 acquires the symbol stream by performing a process reverse to that at the time of signal transmission, for example, frequency down-conversion, conversion into a digital signal, and the like on a signal obtained from an antenna. Further, the reception processing unit 132 acquires a frame by performing demodulation, decoding, and the like on the symbol stream obtained by a process at a preceding stage, and provides the acquired frame to the data processing unit 110 or the control unit 120.

Further, the reception processing unit 132 may perform a process related to separation of a multiplexed frame. More specifically, the reception processing unit 132 performs a process related to separation of a frequency division multiplexed or space division multiplexed frame.

Further, the reception processing unit 132 may estimate a channel gain. Specifically, the reception processing unit 132 calculates complex channel gain information from a preamble part or a training signal part of the signal obtained from the antenna control unit 133. Further, the calculated complex channel gain information is used for a process related to frame multiplexing, a frame separation process, and the like.

The antenna control unit 133 transmits or receives signals via at least one antenna. Specifically, the antenna control unit 133 transmits a signal generated by the transmission processing unit 131 via an antenna, and provides a signal received via the antenna to the reception processing unit 132. Further, the antenna control unit 133 may perform control related to space division multiplexing.

Further, although not illustrated in FIG. 5, the station device 100 may include an input unit and an output unit connected via the interface unit 111. For example, the input unit acquires input information of the user or the like from an input device such as a keyboard or a mouse. Then, the input information or the like is stored in the transmission buffer as data via the interface unit 111. Further, the data stored in the reception buffer is provided to the output unit via the interface unit 111, and the output unit causes a display, a speaker, or the like to output an image, music, a sound, or the like on the basis of the provided data.

3. Operation of Each Station Device in Wireless LAN System

Figure 7:
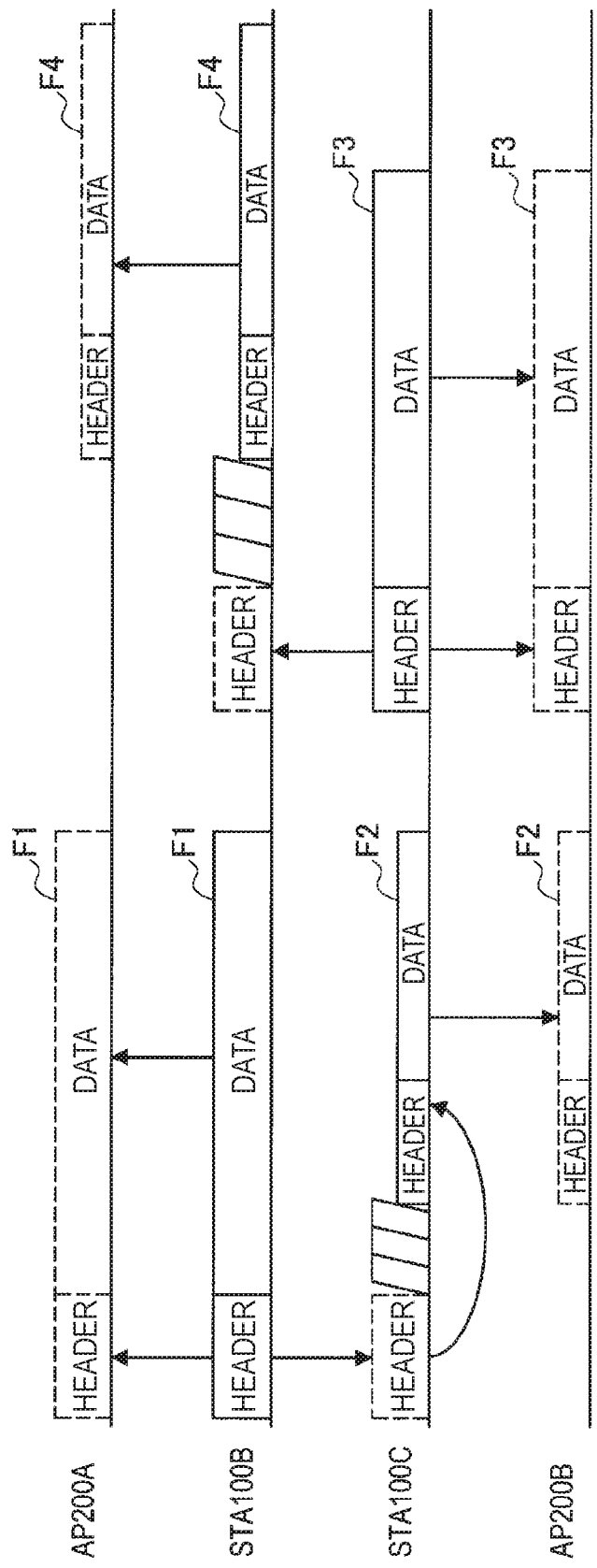
FIG. 7 is a view illustrating an example in which collision of data transmission is prevented by adjusting a length of a transmission frame by a station device in an embodiment of the present disclosure.

The configuration of the station device 100 of the present embodiment has been described above. An operation of the station device 100 according to the present embodiment will be described below in detail. FIG. 7 is a diagram illustrating the operation of the station device 100 of the present embodiment to prevent the collision of the frames illustrated in FIG. 4. Further, in FIG. 7, a height of a frame indicates the transmission power of the frame. In other words, the transmission power of the frame (F1) and the frame (F3) in FIG. 7 is higher than the transmission power of the frame (F2) and the frame (F4).

In the operation example of FIG. 4, since the STA 100B does not receive the header of the frame transmitted by the STA 100C, it is difficult to determine whether or not the frame transmitted by the STA 100C is the OBSS signal. As a result, the STA 100B starts transmitting the frame, and a collision occurs in the AP 200B. Therefore, in the following operation example, the STA 100C adjusts the length of the transmission frame so that the STA 100B can receive the header of the frame transmitted by the STA 100C. Further, as illustrated in FIG. 6, the STA 100B and the STA 100C control the transmission power of the frame on the basis of the reception power of the received OBSS signal.

Like FIG. 4, FIG. 7 is a diagram illustrating an operation example of the STA 100 and the AP 200 in a case in which the spatial reuse is performed. Further, a relation of the AP 200A, the AP 200B, the STA 100B, and the STA 100C illustrated in FIG. 7 is similar to the relation illustrated in FIG. 1.

As illustrated in FIG. 7, if the STA 100B first transmits a frame (F1), the AP 200A and the STA 100C receive a header of the frame transmitted by the STA 100B. Upon detecting the signal, the STA 100C determines whether or not the received signal is the OBSS signal on the basis of BSS Color included in the received header.

The STA 100C determines that the received signal is the OBSS signal and if it is determined that the reception power of the OBSS signal is equal to or lower than OBSS_PD, the STA 100C determines that the medium is in the idle state. Therefore, the STA 100C starts the operation for transmitting the frame (F2) to the AP 200B of the BSS 10B to which the STA 100C belongs.

At this time, the STA 100C acquires the length information of the frame (F1) transmitted by the STA 100B on the basis of the information included in the header received from the STA 100B. Further, the STA 100C determines the reception power of the received OBSS signal. Then, as indicated by arrows in FIG. 7, the STA 100C determines the frame length and the transmission power of the transmission frame (F2) on the basis of these pieces of information.

In the example illustrated in FIG. 7, the frame length of the transmission frame (F2) is adjusted so that the header of the frame (F3) transmitted by STA 100C after the transmission frame (F2) is received by STA 100B. More specifically, the frame length of the transmission frame (F2) is adjusted so that the header of the frame (F3) transmitted by the STA 100C is received by the STA 100B until the STA 100B switches from the transmission operation to the reception operation and then completes the carrier sense for the transmission of the next frame.

For example, as illustrated in FIG. 7, the frame length of the transmission frame (F2) may be adjusted so that the transmission of the transmission frame (F2) is completed at a timing at which the transmission of the frame (F1) transmitted by the STA 100B is completed. This is particularly effective in a case in which the STA 100C need not necessarily execute the carry sense after the frame (F2) is transmitted.

Further, the STA 100C may adjust the frame length by adjusting the length of the data part of the frame format illustrated in FIG. 2. By adjusting the length of the frame (F2) as described above, the STA 100C can start transmitting the next frame (F3) while the STA 100B is performing the carrier sense. Accordingly, the collision of the frames in the AP 200B illustrated in FIG. 4 is prevented.

Further, in FIG. 7, since it is assumed that the reception power of the OBSS signal received from the STA 100B is high, the STA 100C decreases the transmission power to be lower than predetermined reference transmission power and then transmits the frame (F2). Since the STA 100C decreases the transmission power to be lower than predetermined reference transmission power and then transmits the frame (F2) as described above, the transmission of the frame (F2) by the STA 100C does not affect the operation of the AP 200A of receiving the frame (F1) transmitted by the STA 100B. As described above, the station device 100 of the present embodiment adjusts the transmission power in accordance with the reception power of the received OBSS signal.

After the transmission of the frame (F2) with the frame length adjusted as described above is completed, the STA 100C transitions to the operation of the transmission of the next frame (F3). If the STA 100C starts transmitting the frame (F3), the AP 200B and the STA 100B receive the header of the frame (F3) transmitted by the STA 100C.

Accordingly, the STA 100B can recognize that the transmission of the frame (F3) is performed by the STA 100C belonging to a different BSS. Then, the STA 100B decreases the transmission power of the frame (F4) to be lower than the predetermined reference transmission power not to affect the operation of the AP 200B of receiving the frame (F3), and then transmits the frame (F4).

By controlling the operation of the STA 100C and the STA 100B as described above, the transmission collision of the frames illustrated in FIG. 4 is prevented. Further, since the transmission power of the transmission frame is controlled on the basis of the reception power of the OBSS signal, the influence on the reception operation in the AP 200 is reduced. Thus, the throughput of the entire system can be improved.

The operation of each station device 100 in the wireless LAN system has been described above. An operation of each unit of the station device 100 in the above-described operation will be described below in further detail.

Figure 8:
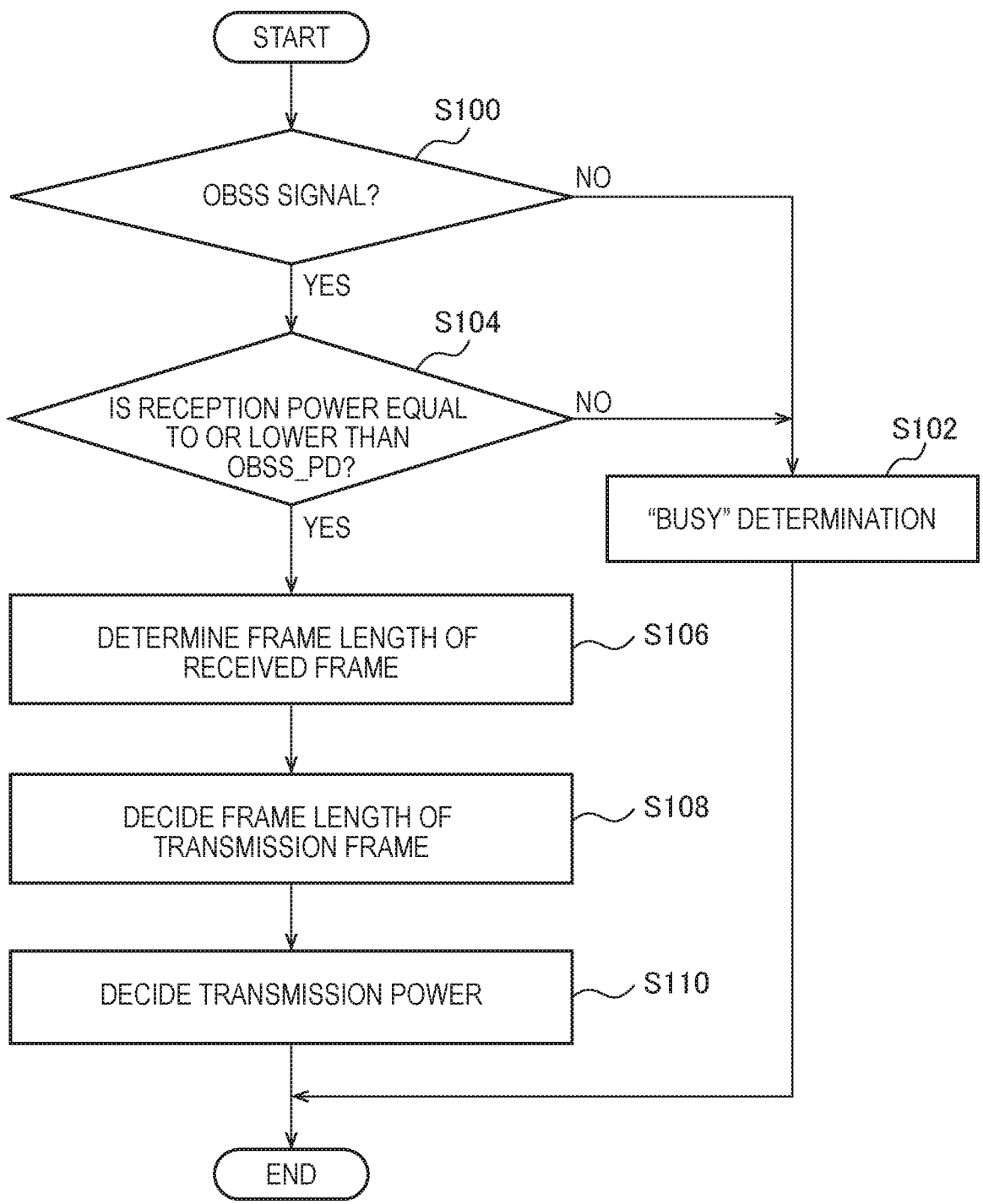
FIG. 8 is a diagram illustrating an example of a process performed by a station device in an embodiment of the present disclosure.

FIG. 8 is a flowchart illustrating an operation of the station device 100. First, in S100, the received frame analyzing unit 114 determines whether or not the received signal is the OBSS signal. Specifically, the received frame analyzing unit 114 determines whether or not the received frame is the OBSS signal on the basis of OBSS_Color included in the received frame. If it is determined that the received signal is not the OBSS signal, the transmission frame deciding unit 123 determines that the medium is in the busy state (S102).

If it is determined that the signal received in S100 is the OBSS signal, the process proceeds to S104. In step S 104, the received frame analyzing unit 114 determines whether or not the reception power of the OBSS signal is equal to or lower than OBSS_PD. Here, if it is determined that the reception power of the OBSS signal is higher than OBSS_PD, the station device 100 determines that the medium is in the busy state (S102).

In a case in which it is determined in S104 that the reception power of the OBSS signal received is equal to or lower than OBSS_PD, the process proceeds to S106. In S106, the length information acquiring unit 124 acquires the length information of the frame of the received OBSS signal.

As described above, the length information is calculated on the basis of RATE and Length included in L-SIG of the header. Further, the length information may be calculated on the basis of TXOP Duration included in the HE-SIG-A2.

Then, in S 108, the transmission frame deciding unit 123 determines the frame length of the transmission frame on the basis of the length information acquired by the length information acquiring unit 124. Further, in S110, the signal control unit 122 determines the transmission power of the frame on the basis of the reception power of the OBSS signal determined in S104. As described above, the signal control unit 122 decreases the transmission power to be lower than the predetermined reference transmission power in a case in which the reception power of the received OBSS signal is high, and does not adjusts the transmission power in a case in which the reception power of the OBSS signal is low.

4. Modified Examples 4-1. Modified Example 1

Figure 9:
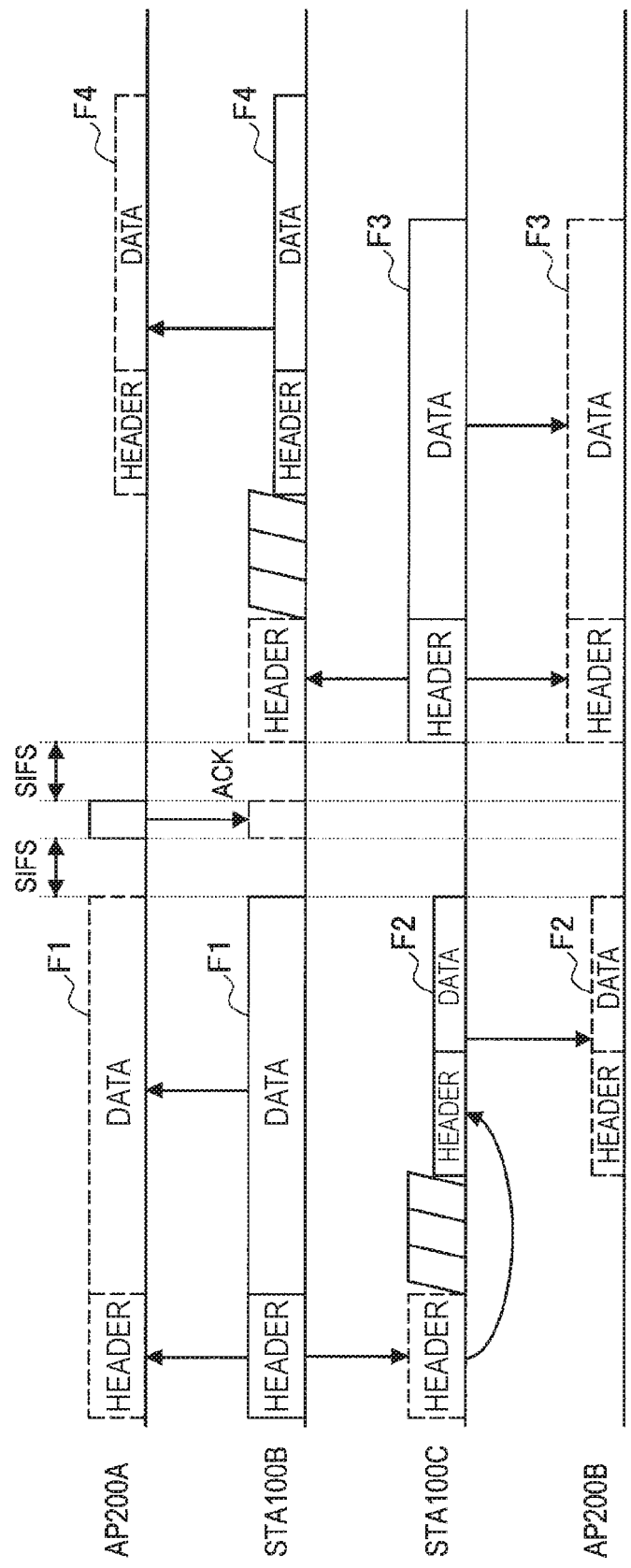
FIG. 9 is a diagram illustrating another example in which collision of transmission frames is prevented in an embodiment of the present disclosure.

The operation example of the station device 100 in the present embodiment has been described above. A modified example of the operation example described above will be described below. In the following modified example, a frame transmission operation in in which a frame sequence of the OBSS signal transmitted by the STA 100B is considered will be described. For example, in the modified example 1, an example in which the STA 100B receives an acknowledgment (ACK) from the AP 200A after the frame (F1) is transmitted will be described as illustrated in FIG. 9.

In the modified example 1, the STA 100B receives the acknowledgment (ACK) after a short inter frame space (SIFS) after the frame (F1) is transmitted. Then, after ACK is received, the STA 100B is on standby for the SIFS.

In order for the STA 100B to receive the header of the frame (F3) transmitted from the STA 100C, the STA 100C has to start transmitting the frame (F3) while the STA 100B is executing the carrier sense.

Therefore, the STA 100C adjusts the frame length of the previous transmission frame (F2) and transmits the frame (F3) before the STA 100B completes the carrier sense. By controlling the transmission timing of the frame (F3) as described above, the STA 100B can receive the header of the frame (F3) transmitted from the STA 100C. By adjusting the timing of the frame transmission by STA 100B as described above, the collision of the frames in the access point 200 can be prevented.

Further, the frame sequence related to the frame (F1) described above is an example, and the modified example described above is also applied to other frame sequence examples. For example, the STA 100B may transmit the frame (F1), receive the acknowledgment (ACK) after the SIFS, and be on standby for a DCF inter frame space (DIFS).

Further, the STA 100B transmits the frame (F1), and receives the acknowledgment (ACK) after the SIFS. Then, the STA 100B may be on standby for the DIFS and be on standby for a predetermined backoff time. As described above, the frame sequence may include various combinations of reception of the acknowledgment, the frame period (IFS), and the backoff time.

Further, for example, the information related to the frame sequence of the STA 100B may be included in the header of the frame (F1) transmitted by the STA 100B. The information related to the frame sequence may be, for example, information indicating that the STA 100B receives the ACK after the frame (F1) is transmitted.

4-2. Modified Example 2

Figure 10:
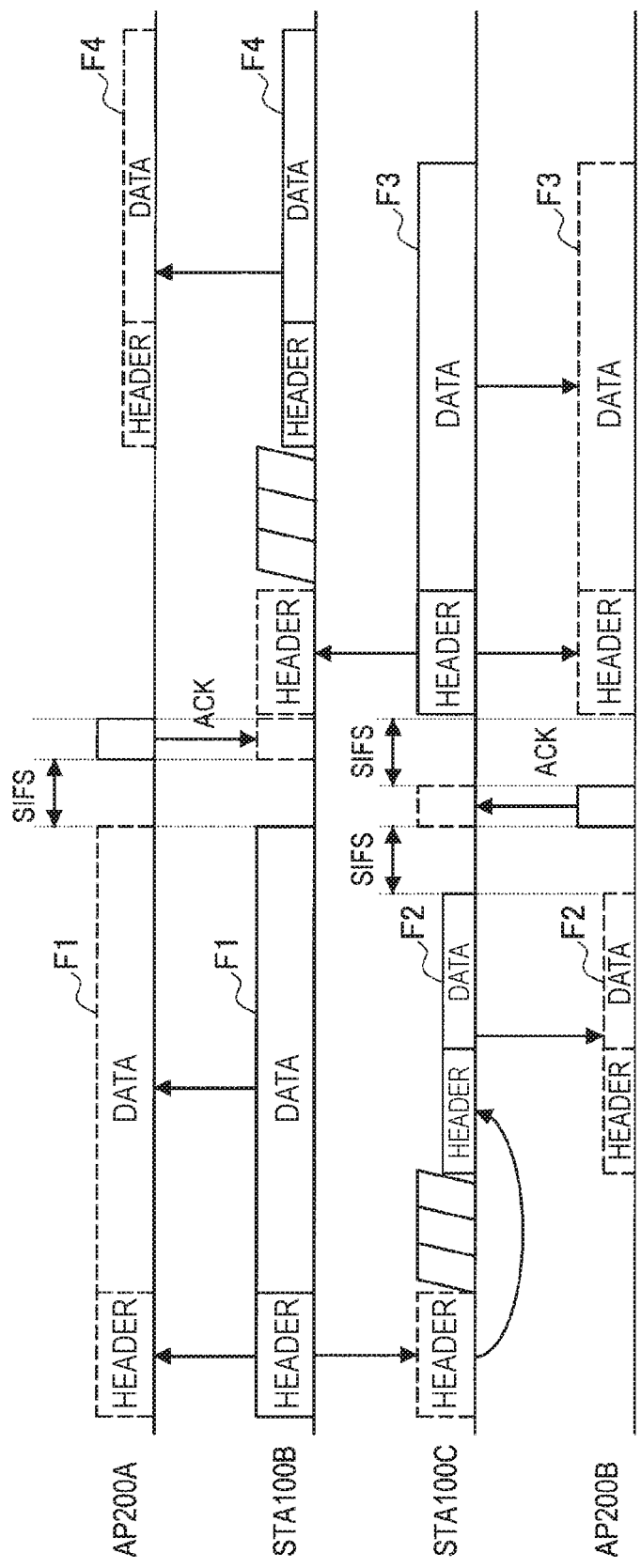
FIG. 10 is a diagram illustrating another example in which collision of transmission frames is prevented in an embodiment of the present disclosure.

The example in which the timing at which the STA 100C transmits the frame (F3) is adjusted in accordance with the frame sequence of the frame (F1) transmitted by the STA 100B has been described above. A modified example 2 in which the STA 100C receives ACK after transmitting the frame (F2) as illustrated in FIG. 10 will be described below.

In the modified example 2, STA 100C receives the acknowledgment (ACK) after the SIFS after the frame (F2) is transmitted. Further, after ACK is received, the STA 100C is on standby for the SIFS and transmits the next frame (F3).

As described above, in order for the STA 100B to receive the header of the frame (F3) transmitted from the STA 100C, the STA 100C has to transmit the frame (F3) before the STA 100B completes the carrier sense.

However, in a case in which the STA 100C receives ACK after the frame (F2) is transmitted, since there is a sequence for receiving ACK, if the transmission of the frame (F2) and the transmission of the frame (F1) are completed at the same time as illustrated in FIG. 7, it is likely to be difficult for the STA 100C to start transmitting the frame (F3) while the STA 100B is executing the carrier sense.

Accordingly, the STA 100C adjusts the frame length of the transmission frame (F2) as illustrated in FIG. 10. In other words, even in a case in which the STA 100C receives ACK and starts transmitting the frame (F3) after the frame (F2) is transmitted, the STA 100C reduces the frame length of the frame (F2) so that the transmission of the frame (F3) can be started while the STA 100B is executing the carrier sense. By adjusting the frame length of the frame (F2) as described above, the STA 100B can receive the header of the frame (F3) transmitted from the STA 100C.

Further, the frame sequence related to the frame (F2) described above is an example, and the modified example described above is also applied to other frame sequence examples. For example, the STA 100C may receive ACK after the frame (F2) is transmitted, be on standby for the DIFS, and then start transmitting the frame (F3). In this case, the STA 100C may further reduce the frame length of the frame (F2) shorter than that in the example described above.

Further, the adjustment of the frame length of the STA 100C may be performed on the basis of the information related to the frame sequence of the frame (F2). By adjusting the frame length by the STA 100C as described above, the collision of the frames in the access point 200 can be prevented.

5. Application Examples

The technology according to the present disclosure can be applied to various products. For example, the STA 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 100 may be wireless communication modules mounted in such terminals (for example, integrated circuit modules configured by one die).

On the other hand, for example, the AP 200 may be realized as a wireless LAN access point (also referred to as a wireless base station) which has a router function or does not have a router function. The AP 200 may be realized as a mobile wireless LAN router. The AP 200 may also be a wireless communication module (for example, an integrated circuit module configured with one die) mounted on such devices.

5-1. First Application Example

Figure 11:
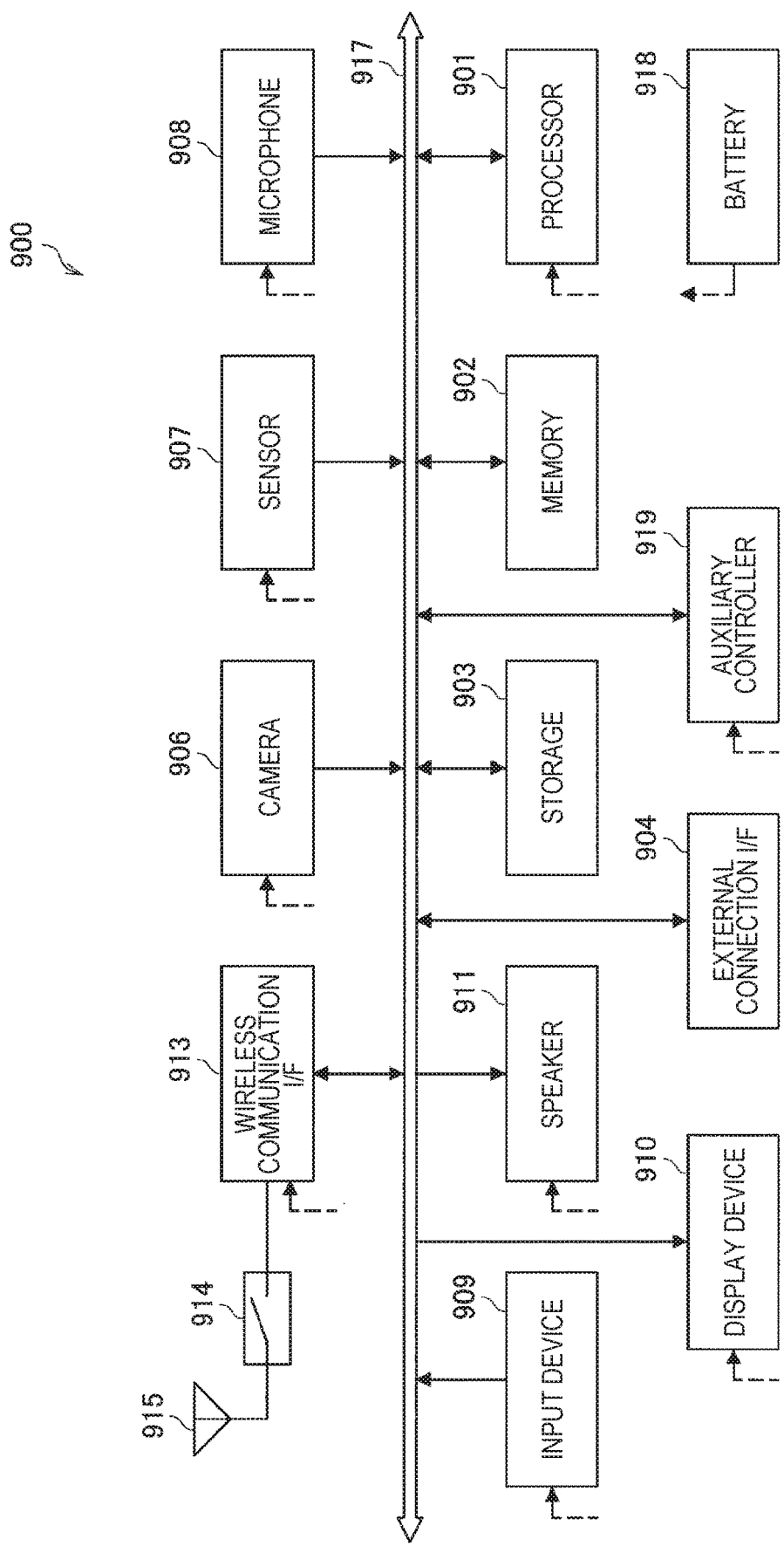
FIG. 11 is a block diagram illustrating an example of a schematic configuration of a smartphone which is an application example of the station devices according to an embodiment of the present disclosure.

FIG. 11 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad, 11ax and the like to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 11. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 11 via power supply lines partially indicated by dashed lines in the drawing. The auxiliary controller 919 causes, for example, necessary minimum functions of the smartphone 900 to be operated in a sleep mode.

Note that the smartphone 900 may operate as a wireless access point (software AP) as the processor 901 executes the function of an access point at an application level. In addition, the wireless communication interface 913 may have the function of a wireless access point.

5-2. Second Application Example

Figure 12:
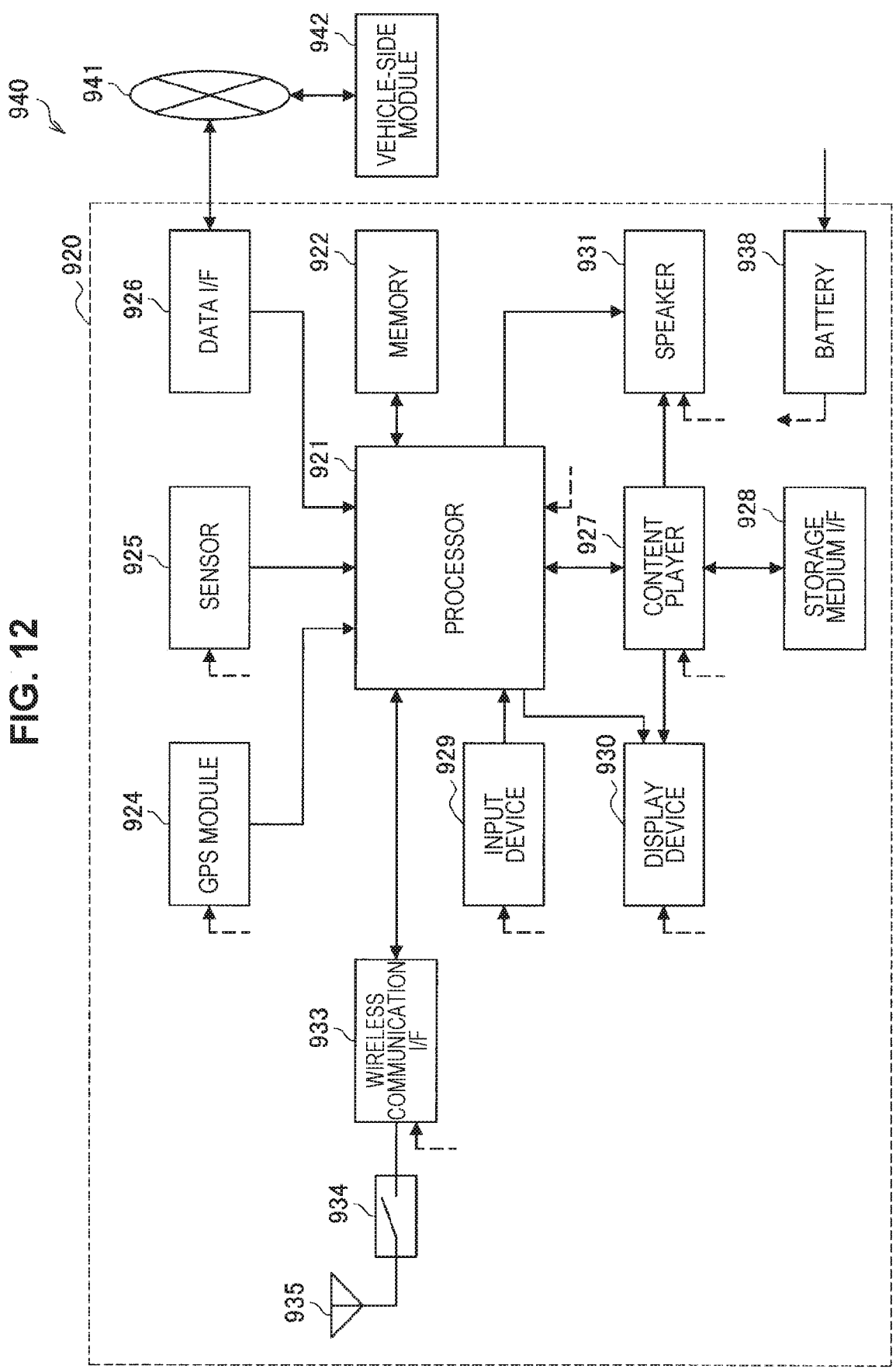
FIG. 12 is a block diagram illustrating an example of a schematic configuration of a car navigation device which is an application example of the station devices according to an embodiment of the present disclosure.

FIG. 12 is a block diagram illustrating an example of a schematic configuration of a car navigation device 920 to which the technology of the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, 11ax and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 12. In this case, the antenna switch 934 may be omitted from the configuration of the car navigation device 920.

The battery 938 supplies electric power to each of the blocks of the car navigation device 920 illustrated in FIG. 12 via power supply lines partially indicated by dashed lines in the drawing. In addition, the battery 938 accumulates electric power supplied from the vehicle side.

In addition, the wireless communication interface 933 may operate as the AP 200 described above, and provide wireless communication for a terminal of a user on the vehicle.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

5-3. Third Application Example

Figure 13:
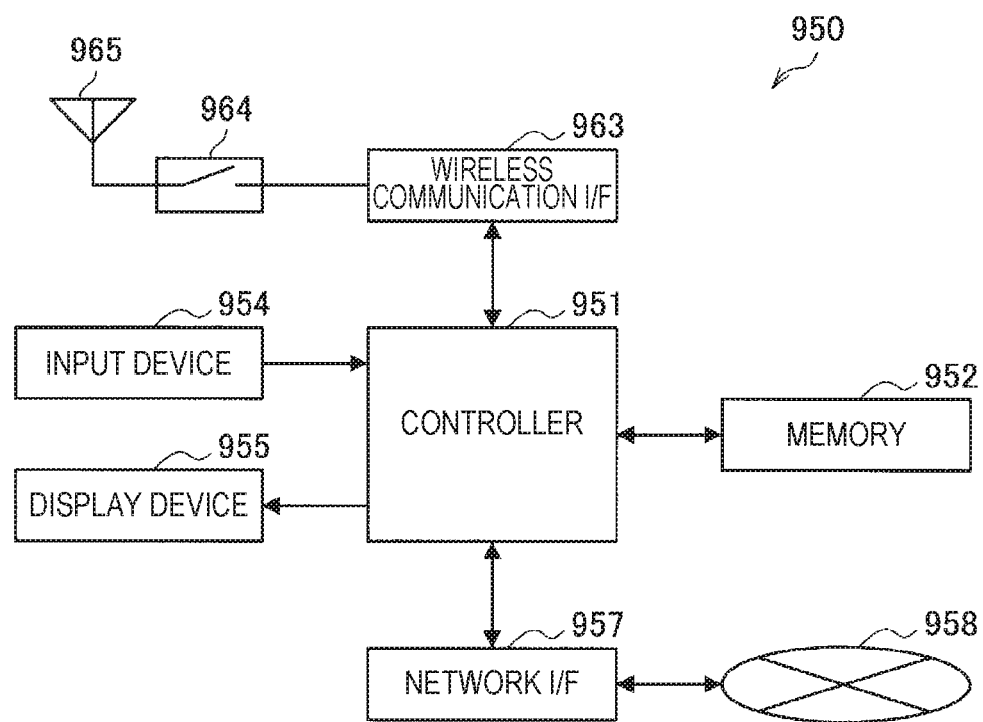
FIG. 13 is a block diagram illustrating an example of a schematic configuration of a wireless access point according to an embodiment of the present disclosure.

FIG. 13 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, 11ax and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

6. Supplemental Remarks

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the information related to the frame sequence described above may include information indicating that the STA 100B and the STA 100C use block ACK. For example, in a case in which the STA 100B uses the block ACK, the STA 100C may start transmitting the next frame (F3) immediately after the frame (F2) illustrated in FIG. 7 is transmitted. Further, in a case in which the STA 100C uses the block ACK, the STA 100C may adjust the frame length of the frame (F2) on the basis of the information. Specifically, in a case in which the block ACK is used, the STA 100C may adjust the frame length of the frame (F2) so that the completion of the transmission of the frame (F2) is synchronized with the completion of the transmission of the frame (F1) transmitted by the STA 100B.

Further, the adjustment of the frame length of the transmission frame by the station device 100 described above is an example and is not limited to the above-described method. The adjustment of the frame length of the transmission frame by the station device 100 may be performed within a range satisfying a condition that the header of the frame (F3) transmitted by the STA 100C is received by the STA 100B until the carrier sense for the transmission of the next frame is completed as illustrated in FIG. 7 after the STA 100B switches from the transmission operation to the reception operation. In other words, the adjustment of the frame length of the transmission frame by the station device 100 may be performed such that the frame length of the frame (F2) is adjusted within the range satisfying the above-described condition until the transmission of the frame (F2) is completed after the transmission of the frame (F1) is completed in the example of FIG. 7.

Further, a computer program for causing the data processing unit 110, the control unit 120, and the wireless communication unit 130 of the station device 100 to operate as described above may be provided. Further, a storage medium having such a program stored therein may be provided.

7. Conclusion

As described above, in the wireless system of the present disclosure, the station device 100 acquires the length information of the frame from the frame transmitted by the other station device 100. Further, the frame length and/or the transmission timing of the transmission frame are adjusted on the basis of the acquired length information of the frame. Accordingly, the header of the frame (F3) transmitted by the STA 100C header is received by STA 100B before the carrier sense for transmission of the next frame is completed after the STA 100B switches from the transmission operation to the reception operation as illustrated in FIG. 7. Therefore, the collision of the frames in the access point 200 is prevented, and the throughput of the radio system is improved.

Further, the station device 100 of the present disclosure controls the transmission power of the frame to be transmitted on the basis of the reception power of the received frame. Accordingly, it is possible to more reliably prevent the collision of the frames in the access point 200.

Additionally, the present technology may also be configured as below.

(1)

A communication device, including:

a receiving unit configured to receive a frame transmitted by another terminal;

a length information acquiring unit configured to acquire length information related to the frame from the received frame; and a transmission frame deciding unit configured to decide a length of a transmission frame on the basis of the acquired length information.

(2)

The communication device according to (1), including a signal determining unit configured to determine whether or not the received frame is a signal transmitted from the other terminal belonging to another network different from a network to which the communication device belongs on the basis of identification information included in the received frame.

(3)

The communication device according to (2), in which the signal determining unit determines whether or not the received frame is transmitted from the other terminal belonging to the other network on the basis of BSS Color included in the received frame.

(4)

The communication device according to any one of (1) to (3), in which the length information acquiring unit acquires length information related to the frame on the basis of information related to a data rate and information related to a frame length included in the received frame.

(5)

The communication device according to any one of (1) to (4), in which the transmission frame deciding unit decides the length of the transmission frame so that transmission of the transmission frame is completed at least before transmission of the received frame is completed.

(6)

The communication device according to any one of (1) to (4), in which the transmission frame deciding unit decides the length of the transmission frame on the basis of information related to a channel use period included in the received frame or information related to a frame sequence of the transmission frame.

(7)

The communication device according to (6), in which the information related to the frame sequence of the transmission frame is information related to an acknowledgment received from an access point after transmission of the transmission frame is completed.

(8)

The communication device according to any one of (1) to (4), in which the transmission frame deciding unit decides a transmission timing of a transmission frame transmitted following the transmission frame on the basis of information related to a frame sequence of the received frame.

(9)

The communication device according to (8), in which the information related to the frame sequence of the received frame is information related to an acknowledgment received from an access point by the other terminal after transmission of a transmission frame transmitted by the other terminal is completed.

(10)

The communication device according to (9), in which the transmission frame deciding unit transmits a transmission frame which is transmitted following the transmission frame at least after the other terminal receives an acknowledgment from the access point.

(11)

The communication device according to any one of (2) to (10), in which the signal determining unit determines reception power of a signal transmitted from the other terminal belonging to the other network, and the transmission frame deciding unit determines that a medium is in an idle state in a case in which the signal determining unit determines that the received frame is the signal transmitted from the other terminal belonging to the other network, and reception power of the signal transmitted from the other terminal belonging to the other network is equal to or lower than a threshold value related to the signal transmitted from the other terminal belonging to the other network.

(12)

The communication device according to any one of (2) to (11), in which the signal determining unit determines reception power of a signal transmitted from the other terminal belonging to the other network, and the communication device includes a transmission power control unit configured to control transmission power of the transmission frame in accordance with the determined reception power of the signal transmitted from the other terminal belonging to the other network.

(13)

The communication device according to (12), in which the transmission power control unit decreases the transmission power of the transmission frame in a case in which the reception power of the signal transmitted from the other terminal belonging to the other network is high and increases the transmission power of the transmission frame in a case in which the reception power of the signal transmitted from the other terminal belonging to the other network is low.

(14)

A communication method, including:

receiving, by a processor, a frame transmitted by another terminal;

acquiring, by the processor, length information related to the frame from the received frame; and deciding, by the processor, a length of a transmission frame on the basis of the acquired length information.

(15)

A program causing a processor to:

receive a frame transmitted by another terminal;

acquire length information related to the frame from the received frame; and decide a length of a transmission frame on the basis of the acquired length information.

REFERENCE SIGNS LIST

100 station device
110 data processing unit
120 control unit
130 wireless communication unit
200 access point

The invention claimed is:

1. A communication device, comprising:
receiving circuitry configured to receive a frame;
transmitting circuitry; and
processing circuitry configured to:
determine whether or not the received frame is a signal transmitted from another terminal belonging to another network different from a network to which the communication device belongs on a basis of BSS Color information included in the received frame;
acquire length information related to the frame from the received frame;
decide a length of a transmission frame on a basis of the acquired length information;
determine a reception power of the signal transmitted from the other terminal belonging to the other network;
control transmission power of the transmission frame in accordance with the determined reception power such that:
the transmission power of the transmission frame is decreased in a case in which the determined reception power is above a threshold value, or
the transmission power of the transmission frame is increased in a case in which the determined reception power is below the threshold value; and
transmit the transmission frame in accordance with the controlled transmission power.

2. The communication device according to claim 1, wherein the processing circuitry acquires the length information related to the frame on a basis of information related to a data rate and information related to a frame length included in the received frame.

3. The communication device according to claim 1, wherein the processing circuitry decides the length of the transmission frame so that transmission of the transmission frame is completed at least before reception of the received frame is completed.

4. The communication device according to claim 1, wherein the processing circuitry decides the length of the transmission frame on a basis of information related to a channel use period included in the received frame or information related to a frame sequence of the transmission frame.

5. The communication device according to claim 4, wherein the information related to the frame sequence of the transmission frame is information related to an acknowledgment received from an access point after transmission of the transmission frame is completed.

6. The communication device according to claim 1, wherein the processing circuitry decides a transmission timing of a second transmission frame transmitted following the transmission frame on a basis of information related to a frame sequence of the received frame.

7. The communication device according to claim 6, wherein the information related to the frame sequence of the received frame is information related to an acknowledgment received from an access point by the other terminal after transmission of a transmission frame transmitted by the other terminal is completed.

8. The communication device according to claim 7, wherein the processing circuitry controls the transmitting circuitry to transmit a transmission frame which is transmitted following the transmission frame at least after the other terminal receives an acknowledgment from the access point.

9. The communication device according to claim 1, wherein the processing circuitry determines reception power of a signal transmitted from the other terminal belonging to the other network, and the processing circuitry determines that a medium is in an idle state in a case in which the signal determining unit determines that the received frame is the signal transmitted from the other terminal belonging to the other network, and reception power of the signal transmitted from the other terminal belonging to the other network is equal to or lower than the threshold value.

10. A communication method by a communication device including a transceiver and a processor, the method comprising:

receiving, by the processor, a frame;
determine whether or not the received frame is a signal transmitted from another terminal belonging to another network different from a network to which the communication device belongs on a basis of BSS Color information included in the received frame;
acquiring, by the processor, length information related to the frame from the received frame;
deciding, by the processor, a length of a transmission frame on a basis of the acquired length information;
determining a reception power of the signal transmitted from the other terminal belonging to the other network;
controlling transmission power of the transmission frame in accordance with the determined reception power such that:

the transmission power of the transmission frame is decreased in a case in which the determined reception power is above a threshold value, or
the transmission power of the transmission frame is increased in a case in which the determined reception power is below the threshold value; and
transmitting the transmission frame in accordance with the controlled transmission power.

11. A non-transitory computer readable program product containing a program that causes a processor to:

receive a frame;
determine whether or not the received frame is a signal transmitted from another terminal belonging to another network different from a network to which the communication device belongs on a basis of BSS Color information included in the received frame;
acquire length information related to the frame from the received frame;
decide a length of a transmission frame on a basis of the acquired length information;
determine a reception power of the signal transmitted from the other terminal belonging to the other network;
control transmission power of the transmission frame in accordance with the determined reception power such that:

the transmission power of the transmission frame is decreased in a case in which the determined reception power is above a threshold value, or
the transmission power of the transmission frame is increased in a case in which the determined reception power is below the threshold value; and
transmit the transmission frame in accordance with the controlled transmission power.

* * * * *